United States Patent
Darling et al.

(10) Patent No.: US 9,623,981 B2
(45) Date of Patent: Apr. 18, 2017

(54) AIRCRAFT FUEL TANK ULLAGE GAS MANAGEMENT SYSTEM

(71) Applicant: Hamilton Sundstrand Corporation, Windsor Locks, CT (US)

(72) Inventors: Robert Mason Darling, South Windsor, CT (US); Michael L. Perry, Glastonbury, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 0 days.

(21) Appl. No.: 14/552,100

(22) Filed: Nov. 24, 2014

(65) Prior Publication Data

US 2016/0144973 A1    May 26, 2016

(51) Int. Cl.

| | |
|---|---|
| H01M 8/04 | (2016.01) |
| B64D 37/32 | (2006.01) |
| C25B 1/00 | (2006.01) |
| C25B 15/08 | (2006.01) |
| C25B 1/04 | (2006.01) |
| C25B 9/10 | (2006.01) |

(52) U.S. Cl.
CPC .............. B64D 37/32 (2013.01); C25B 1/00 (2013.01); C25B 1/04 (2013.01); C25B 9/10 (2013.01); C25B 15/08 (2013.01); Y02E 60/366 (2013.01)

(58) Field of Classification Search
CPC ......... H01M 2250/20; H01M 8/04014; H01M 8/04164
See application file for complete search history.

(56) References Cited

U.S. PATENT DOCUMENTS

| | | |
|---|---|---|
| 5,503,944 A | 4/1996 | Meyer |
| 5,853,909 A | 12/1998 | Reiser |
| (Continued) | | |

FOREIGN PATENT DOCUMENTS

| | | |
|---|---|---|
| WO | 2007057188 A1 | 5/2007 |
| WO | 2013140152 A1 | 9/2013 |

OTHER PUBLICATIONS

Search Report regarding related EP App. No. 15196007.7; dated Mar. 30, 2016; 7 pgs.

*Primary Examiner* — Mark F Huff
*Assistant Examiner* — Olatunji Godo
(74) *Attorney, Agent, or Firm* — Cantor Colburn LLP

(57) ABSTRACT

An aircraft fuel tank ullage gas management system is disclosed. The system includes an electrochemical cell having a membrane electrode assembly that includes a cathode and anode separated by an electrolyte separator. A cathode fluid flow path is in fluid communication with the cathode, and receives the flow of cabin air from the cabin air fluid flow path and discharges nitrogen-enriched air. An anode fluid flow path is in fluid communication with the anode, and discharges oxygen or oxygen-enriched air. The electrochemical cell also includes water in fluid communication with the anode. The system includes an electrical power source and electrical connections to the anode and cathode for providing an electric potential difference between the anode and cathode. An ullage flow path receives nitrogen-enriched air from the cathode fluid flow path and delivers it to the fuel tank. An optional flow path delivers humidified oxygen-enriched air back to the cabin.

17 Claims, 2 Drawing Sheets

(56) References Cited

U.S. PATENT DOCUMENTS

| | | | |
|---|---|---|---|
| 5,916,505 A * | 6/1999 | Cisar | B01D 53/22 |
| | | | 264/129 |
| 2003/0233936 A1 | 12/2003 | Crom | |
| 2008/0028766 A1* | 2/2008 | Masada | F01K 23/02 |
| | | | 60/784 |
| 2008/0070078 A1* | 3/2008 | Gummalla | B64D 41/00 |
| | | | 429/410 |
| 2008/0187785 A1 | 8/2008 | Kwok | |
| 2013/0078541 A1 | 3/2013 | Gummalla | |

* cited by examiner

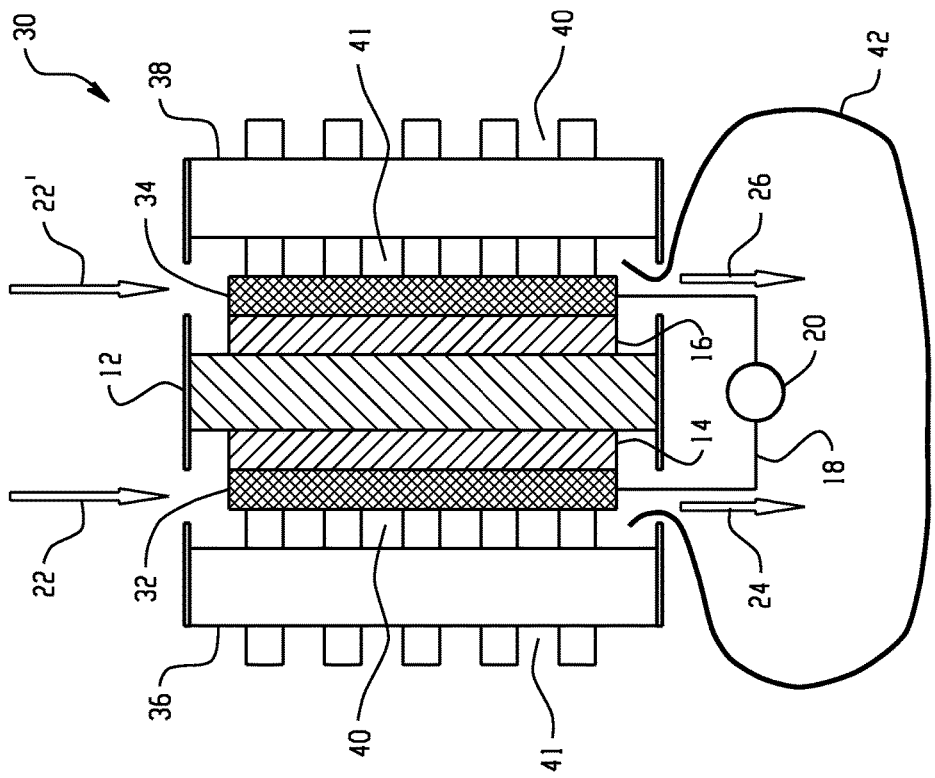
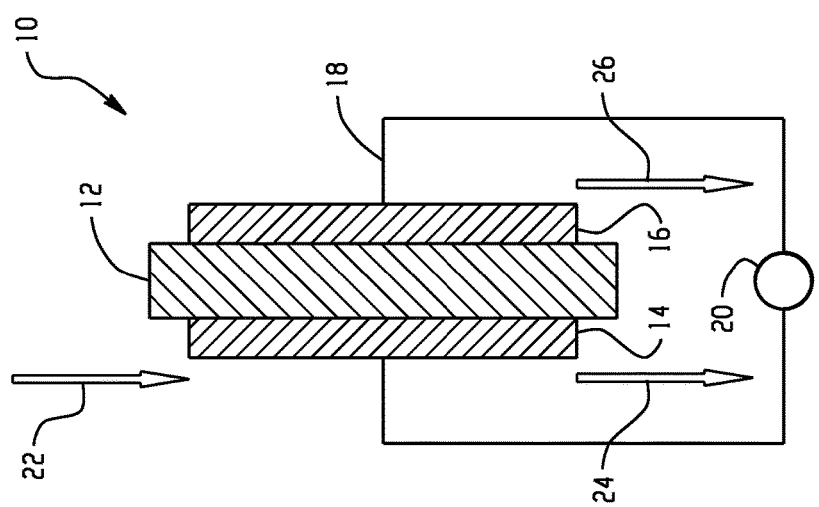
Fig. 2
Fig. 1

AIRCRAFT FUEL TANK ULLAGE GAS MANAGEMENT SYSTEM

BACKGROUND OF THE INVENTION

The present invention generally relates to a method and system for inerting aircraft fuel tanks by providing a nitrogen enriched air supply.

It is recognized that fuel vapors within fuel tanks create become combustible in the presence of oxygen. An inerting system decreases the probability of combustion of inflammable materials stored in a fuel tank by maintaining a chemically non-reactive or inert gas, such as nitrogen, in the fuel tank vapor space also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration threshold, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen to the ullage, thereby displacing oxygen with nitrogen.

It is known in the art to equip aircraft with onboard inert gas generating systems, which supplies nitrogen-enriched air (NEA) to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system. Moreover, certain flight conditions such as during aircraft descent can lead to an increased demand for NEA at precisely the time when engines are throttled back so that sufficient compressed air may not be available. Additionally, there is a trend to reduce or eliminate bleed-air systems in aircraft; for example Boeing's 787 has a no-bleed systems architecture, which utilizes electrical systems to replace most of the pneumatic systems in order to improve fuel efficiency, as well as reduce weight and lifecycle costs. A separate compressor or compressors can be used to provide pressurized air to the membrane gas separator, but this undesirably increases aircraft payload, and also represents another onboard device with moving parts that are subject to maintenance issues or device failure. Additionally, the membranes in such gas separators are subject to fouling over time.

BRIEF DESCRIPTION OF THE INVENTION

According to some aspects of the invention, an aircraft fuel tank ullage gas management system comprises a cabin air fluid flow path that receives a flow of aircraft cabin air. The system also includes an electrochemical cell comprising a membrane electrode assembly that comprises a cathode and an anode separated by an electrolyte separator such as a polymer electrolyte membrane. A cathode fluid flow path is in fluid communication with the cathode, and receives the flow of cabin air from the cabin air fluid flow path and discharges nitrogen-enriched air. An anode fluid flow path is in fluid communication with the anode, and discharges oxygen or oxygen-enriched air. The electrochemical cell also includes water in fluid communication with the anode. The system includes an electrical power source and electrical connections to the anode and cathode for providing an electric potential difference between the anode and cathode. An ullage flow path receives the dehumidified nitrogen-enriched air from the cathode fluid flow path and delivers it to the fuel tank.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic depiction of a membrane electrode assembly as described herein;

FIG. 2 is a schematic depiction of an exemplary electrochemical cell as described herein;

DETAILED DESCRIPTION OF THE INVENTION

Figure 3:
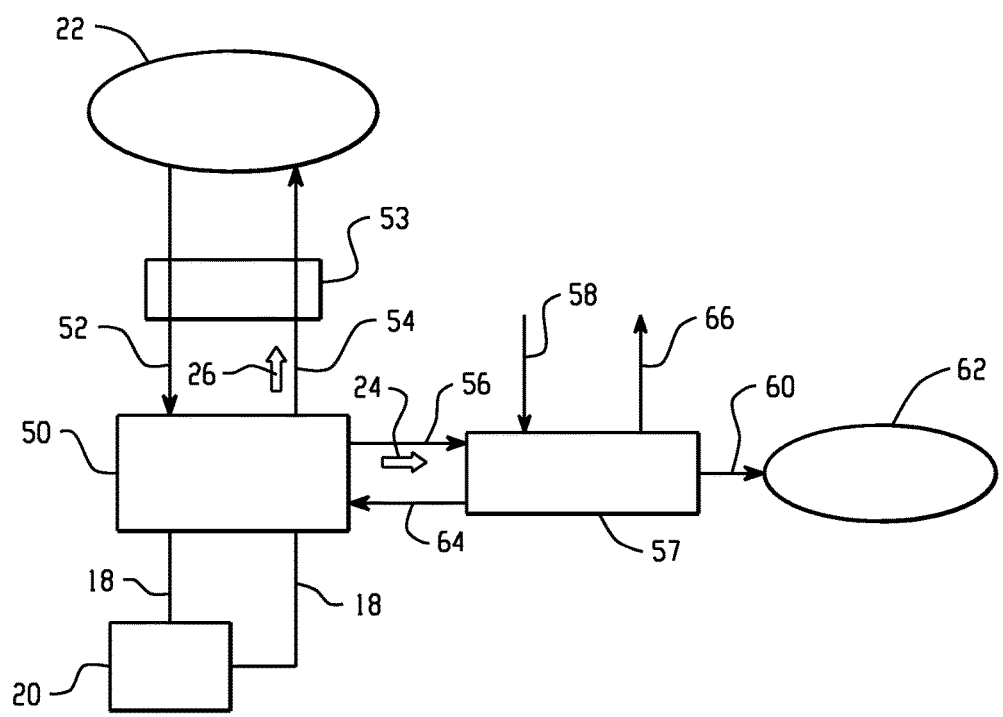
FIG. 3 is a schematic depiction of an exemplary aircraft fuel tank ullage gas management system.

Referring to FIG. 1, a membrane electrode assembly (MEA) 10 is schematically depicted. The MEA 10 comprises a proton exchange membrane (PEM) 12 having a cathode 14 disposed on one side and an anode 16 disposed on the other side. Exemplary materials from which the MEA 10 can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E.I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells. Cathode 14 and anode 16 can be fabricated from catalytic materials suitable for performing the needed electrochemical reaction (e.g., the oxygen-reduction reaction on the cathode and the electrolysis of water on the anode). Exemplary catalytic materials include, but are not limited to, platinum, palladium, rhodium, carbon, gold, tantalum, tungsten, ruthenium, iridium, osmium, alloys thereof, and the like, as well as combinations of the foregoing materials. Cathode 14 and anode 16 are positioned adjacent to, and preferably in contact with the PEM 12 and can be solid metal layers deposited (e.g., by vapor deposition) onto the PEM 12, or can have structures comprising discrete catalytic particles adsorbed onto a porous substrate that is attached to the PEM 12. Alternatively, the catalyst particles can be deposited on high surface area powder materials (e.g., graphite or porous carbons or metal-oxide particles) and then these supported catalysts may be deposited directly onto the PEM 12 or onto a porous substrate that is attached to the PEM 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the PEM 12. In either case, the cathode and anode layers 14 and 16 may also include a binder material, such as a polymer, especially one that also acts as an ionic conductor such as proton-conducting ionomers (e.g., NAFION™). In this case, the cathode and anode layers 14 and 16 may be cast from an "ink," which is a suspension of supported (or unsupported) catalyst, ionomer, and a solvent that is typically an aqueous solution (e.g., a mixture of alcohol(s) and water) using processes that are like those used to make catalyst layers used in PEM-based fuel cells.

During operation of the system, water at the anode undergoes an electrolysis reaction according to the formula

$$H_2O \rightarrow \tfrac{1}{2}O_2 + 2H^+ + 2e^- \qquad (1)$$

The electrons produced by this reaction are drawn by an electrical circuit 18 powered by electric power source 20 connecting the positively charged anode 16 with the cathode 14. The hydrogen ions (i.e., protons) produced by this reaction migrate across the PEM 12, where they react with oxygen in cabin air 22 is fed to the cathode to produce water according to the formula

$$\tfrac{1}{2}O_2 + 2H^+ + 2e^- \rightarrow H_2O \qquad (2)$$

It should be noted here that as used herein, the term "cabin air" includes air from the passenger cabin and any other areas containing environmentally conditioned air, such as the cockpit, crew areas, cargo hold, and service areas of an aircraft. Removal of oxygen from cabin air 22 produces nitrogen-enriched air (NEA) 24 exiting the region of the cathode 14. The oxygen produced at the anode 16 by the reaction of formula (1) is discharged as oxygen or oxygen-enriched air stream 26, depending on what is fed to the anode 16.

As mentioned above, the electrolysis reaction occurring at the positively charged anode 16 requires water, and the ionic polymers used for PEM 12 perform more effectively in the presence of water. Accordingly, in some embodiments, the membrane electrode assembly 10 is saturated with water or water vapor. Although the reactions (1) and (2) are stoichiometrically balanced with respect to water so that there is no net consumption of water, in practice moisture will be removed by NEA 24 (either entrained or evaporated into the nitrogen-enriched air) as it exits from the region of cathode 14. Accordingly, in some exemplary embodiments, water is circulated past the anode 16 along an anode fluid flow path (and optionally also past the cathode 14). Such water circulation can also provide cooling for the electrochemical cells. In some exemplary embodiments, water is provided at the anode from humidity in air along an anode fluid flow path in fluid communication with the anode. It should also be noted that, although the invention includes embodiments where a single electrochemical cell is employed, in practice multiple electrochemical cells will be electrically connected in series with fluid flow connections to distribute cabin air 22 to and collect NEA 24 from the cathode side of each cell.

FIG. 2 is a schematic depiction of an electrochemical cell 30 containing the components of MEA 10 (FIG. 1) and additional components, where numbering from FIG. 1 is carried over. Current collectors 32 and 34 are disposed on cathode 14 and anode 16, respectively. Current collectors 32, 34 can be configured as an electrically conductive 3-dimensional mesh or screen so that they also provide part of a cathode fluid flow path or anode fluid flow path with the void space in the 3-D mesh or screen, as well as an electrical connection between the electrodes and the bipolar plates 36 and 38. Alternatively, either or both of the current collectors 32, 34 can be flat screens, and the anode or cathode flow path can be provided by a separate flow-field structure or by features (e.g., channels) on bipolar plates 36 and 38. The bipolar plates 36 and 38 are each electrically connected to an anode or cathode of adjacent electrochemical cells (not shown). The bipolar plates 36 and 38 can optionally be microporous for transport and management of water from a water circulation loop 42. Additional details regarding such microporous bipolar plates that are disclosed in U.S. Pat. No. 5,503,944 "Water management system for solid polymer electrolyte fuel cell power plants" and U.S. Pat. No. 5,853,909, the disclosure of which is incorporated herein by reference in its entirety. The bipolar plates also have cathode fluid flow channels 40 that provide part of the cathode fluid flow path, and anode fluid flow channels 41 that provide part of an anode fluid flow path. In embodiments where the bipolar plates 36, 38 are microporous, they can be microporous on both sides of the plate or can be microporous on only one side such as the side facing anode 16. It should be noted that water circulation loop 42 is exemplary and schematic in nature, and is shown in a simplified fashion for ease of illustration. In practice, the water circulation loop 42 can include flow channels within the cell stack, and in places can occupy the same physical space as gas flow paths such as the flow path for cabin air, in which case gas is bubbled through a water-containing conduit. The water circulation loop 42 can also include other components such as circulation pump (not shown), a water reservoir (not shown), or a demineralizer bed (not shown). In some exemplary embodiments, cabin air 22' is introduced to the anode flow path through the current collector 34, and oxygen-enriched air 26 can be exhausted or recycled to the aircraft cabin. In other exemplary embodiments, no cabin air 22' is provided to the anode 16, in which case oxygen generated at the anode current collector 34 can be collected in anode fluid flow channels 41 designed for this purpose. The almost pure oxygen that exits the anode in this case 26 can be exhausted or mixed with fresh air, or cabin air, and recycled to the aircraft cabin.

Turning now to FIG. 3, where numbering from FIGS. 1 and 2 is carried over, an electrochemical cell stack 50 receives cabin air 22 from cabin air flow path 52 and returns oxygen-enriched air 26 to the cabin along cabin air return flow path 54 from the anode side of the electrochemical cells in the electrochemical cell stack 50. The heat absorption side of a heat exchanger 53 can optionally be disposed in fluid communication along cabin air flow path 52 to pre-heat cabin air 22 by absorbing heat from oxygen-enriched air 26 flowing along the cabin air return flow path 54. The cabin air on cabin air flow path 52 does not require compression as do conventional permeable membrane-based nitrogen-oxygen separators, and can be provided by a fan or similar air movement device (not shown). Nitrogen-enriched air is discharged from the cathode side of the electrochemical cells in the electrochemical cell stack 50 along flow path 56. In some embodiments, the NEA can flow directly to the fuel tank(s) 62. However, the NEA exiting the electrochemical cell stack 50 can have a high water vapor level that should be reduced before reaching the fuel tank 62. Accordingly, in some embodiments, the NEA is processed in a heat exchanger/condenser 57, where it is cooled by ambient air 58. The loss of heat from the NEA causes water vapor in the NEA to condense, and liquid water condensate can be returned by flow path 64 to the electrochemical cell stack 50 where it can provide water at the anode side of the electrochemical cells for the reaction of formula (1) or to keep the MEA 12 (FIG. 1) hydrated. Dried NEA is discharged from the heat exchanger condenser 57 along flow path 60 leading to fuel tank(s) 62. Heated ambient air 66 from the heat absorption side of the heat exchanger condenser 57 can be exhausted to the atmosphere or can be used as an additional source of heat in heat exchanger 53 or in another heat exchanger to pre-heat the cabin air on cabin air flow path 52, or as a source of heat for other aircraft system components. Also depicted in FIG. 3 is an optional water-recirculation loop 18 that includes a water reservoir 20 and a method to circulate the water (not shown).

Figure 4:
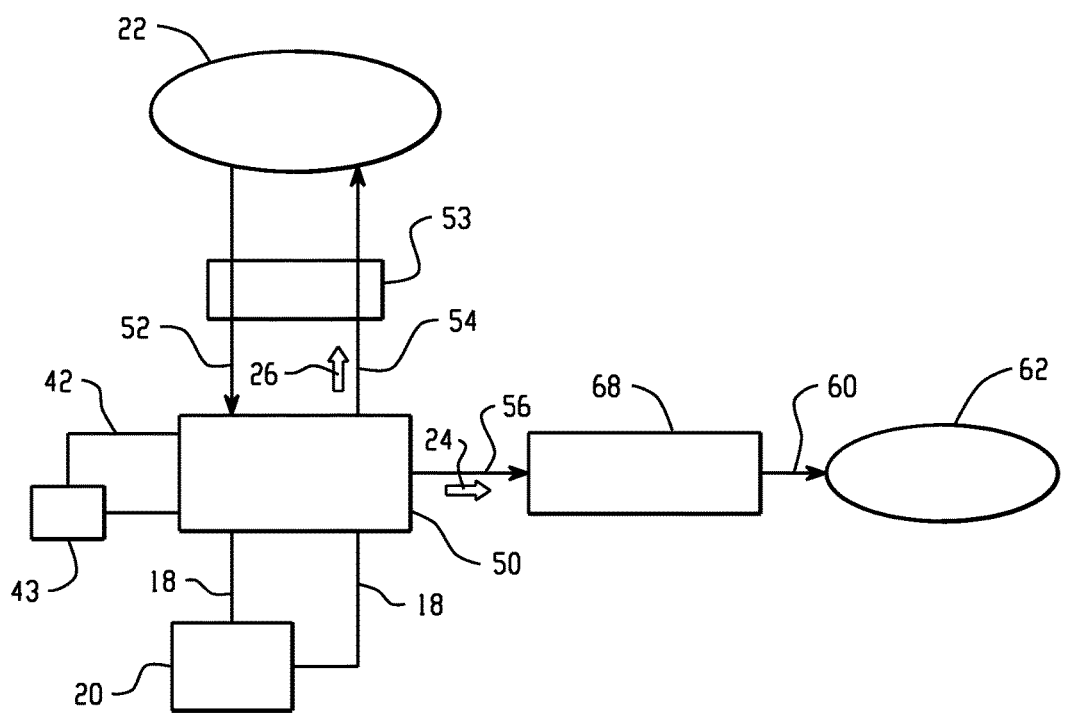
FIG. 4 is a schematic depiction of another exemplary aircraft fuel tank ullage gas management system.

Turning to FIG. 4, this figure is identical to FIG. 3, except that the NEA discharged to flow path 56 from the electrochemical cell stack 50 is dried by a desiccant bed 68 instead of by heat exchanger condenser 57. The desiccant in desiccant bed 68 can be periodically regenerated by exposure to heat from a hot air source such as waste heat from the electrochemical cell stack 50 or to dry air such as cabin air 22. In another exemplary embodiment (not shown), the NEA discharged to flow path 56 can be dried by transferring moisture through a semi-permeable membrane that selectively transports water vapor to cabin air 22 or the cabin air 22' (FIG. 2) fed to the anode flow path adjacent to anode 16.

In addition to supplying NEA to the ullage of the fuel tank(s) onboard the aircraft, the NEA may be also be used for other functions, such as serving as a fire-suppression agent. For example, cargo compartments onboard aircraft typically have fire-suppression systems that include a dedicated gas-distribution system comprising tubes routed to nozzles in the cargo bay to deploy fire-suppression agents in the event of a fire. A variety of fire-suppression agents may be deployed depending on the type and extent of the fire. In the case of a fire, all or some of the NEA could be routed to one or more of these fire-suppression distribution systems. This may be especially beneficial during the aircraft descent when the cargo bay is becoming re-pressurized to reduce the ingress of oxygen that can feed the fire. In this case, the system may be operated to produce NEA at the maximum flow rate. The NEA could also be used to enable inerting coverage over extended periods, which may be in addition to, or in lieu of, dedicated low-rate discharge inerting systems in the cargo bay(s).

During operation, the system can be controlled to set fluid flow rates (e.g. feed rates of cabin air 22 to the cathode 14, or of cabin air 22' to the anode 16, or of water or water vapor (in air) to the anode 16, the water-circulation flow rate and pressure, or any combination thereof) and the current or voltage levels produced by electric power source 20 to produce varying amounts of NEA in response to system parameters. Such system parameters can include, but are not limited to temperature of the fuel in fuel tank 62, oxygen content of the fuel in fuel tank 62, oxygen content of vapor in the ullage of fuel tank 62, and temperature and/or pressure of vapor in the ullage of fuel tank 62, and temperature, oxygen content, and/or humidity level of the cabin air. Accordingly, in some embodiments, the fuel tank ullage gas management system such as shown in FIGS. 3 and 4 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to a system controller. In some embodiments, the system controller can be dedicated to controlling the fuel tank ullage gas management system, such that it interacts with other onboard system controllers or with a master controller. In some embodiments, data provided by and control of the fuel tank ullage gas management system can come directly from a master controller.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft fuel tank ullage gas management system, comprising
  a cabin air fluid flow path that receives a flow of aircraft cabin air;
  an electrochemical cell comprising a membrane electrode assembly that comprises a cathode and an anode separated by an electrolyte separator, a cathode fluid flow path in fluid communication with the cathode that receives the flow of cabin air from the cabin air fluid flow path and discharges nitrogen-enriched air, an anode fluid flow path in fluid communication with the anode, water in fluid communication with the anode;
  an electrical power source and electrical connections to the anode and cathode that provides power to an electrical circuit connecting the anode and cathode; and
  an ullage flow path that receives nitrogen-enriched air from the cathode fluid flow path and delivers it to the fuel tank.

2. The system of claim 1, further comprising a gas dryer disposed along the ullage flow path to dry the nitrogen-enriched air.

3. The system of claim 2, wherein the gas dryer is a heat exchanger condenser having a heat rejection side in fluid communication with the nitrogen-enriched air, and a heat absorption side in fluid communication with ambient air.

4. The system of claim 3, further comprising a condensate flow path that receives water condensed in the heat exchanger condenser and delivers it to the anode.

5. The system of claim 2, wherein the gas dryer comprises a desiccant.

6. The system of claim 5, further comprising a thermal flow path to transfer heat from electrochemical cell to the gas dryer for regeneration of the desiccant, or a dryer regeneration fluid flow path that receives a flow of aircraft cabin air.

7. The system of claim 1, further comprising a cabin air return fluid flow path that receives an anode exhaust stream from the anode fluid flow path and discharges it to the cabin.

8. The system of claim 7, further comprising a cabin air heat exchanger having a heat absorption side in fluid communication with the cabin air fluid flow path, and a heat rejection side in fluid communication with the cabin air return fluid flow path.

9. The system of claim 1, that is configured to control electrical current and cabin air flow rate on the cabin air fluid flow path in response to a demand signal for nitrogen-enriched air.

10. The system of claim 1, further comprising a water flow loop in fluid communication with the anode.

11. The system of claim 10, further comprising a microporous plate adjacent to the anode, comprising micro-channels in fluid communication with the water flow loop.

12. The system of claim 1, wherein the electrochemical cell is disposed in an electrochemical cell stack with one or more additional electrochemical cells comprising membrane electrode assemblies.

13. The system of claim 12, further comprising a microporous bipolar plate disposed between each pair of adjacent electrochemical cells in the stack, comprising micro-channels in fluid communication with a water flow loop that is in fluid communication with the membrane electrode assemblies in the stack.

14. The system of claim 1, wherein the electrolyte separator is a polymer electrolyte membrane.

15. The system of claim 1, further comprising an auxiliary flow path that receives nitrogen-enriched air from the cathode fluid flow path and delivers it to a cargo bay, engine compartment, or other area of the aircraft to aid in fire suppression or provide an inerting atmosphere.

16. The system of claim 1, wherein the electrical power source provides power to the circuit connecting the cathode and the anode at a voltage to hydrolyze water at the anode and form water at the cathode.

17. A method of operating the system of claim 1, comprising
hydrolyzing water at the anode to form oxygen, hydrogen ions, and free electrons;
migrating the hydrogen ions across the electrolyte separator;
providing power from the electrical power source to the circuit to transport the free electrons through the circuit to the cathode; and
combining the free electrons, the hydrogen ions, and oxygen from the cabin air at the cathode to form water and the nitrogen enriched air.

* * * * *